United States Patent [19]
Burton et al.

[11] Patent Number: 6,068,244
[45] Date of Patent: May 30, 2000

[54] TRAY ATTACHMENT APPARATUS

[75] Inventors: Larry W. Burton, De Soto; Fred G. Tahmassi, Carrollton, both of Tex.

[73] Assignee: ATM International, Inc., Richardson, Tex.

[21] Appl. No.: 09/183,751

[22] Filed: Oct. 30, 1998

[51] Int. Cl.$^7$ .................................................. B01F 3/04
[52] U.S. Cl. .................................... 261/114.4; 261/114.5
[58] Field of Search ........................... 261/114.1, 114.2, 261/114.3, 114.5, 114.4; 202/158

[56] References Cited

U.S. PATENT DOCUMENTS

| | | |
|---|---|---|
| 4,051,206 | 9/1977 | Bunas et al. . |
| 4,120,919 | 10/1978 | McClain . |
| 4,133,852 | 1/1979 | DiNicolantonio . |
| 4,174,363 | 11/1979 | Bruckert . |
| 4,247,521 | 1/1981 | Forte et al. . |
| 4,749,528 | 6/1988 | Lavin . |
| 5,454,989 | 10/1995 | Nutter . |
| 5,468,425 | 11/1995 | Nutter . |

FOREIGN PATENT DOCUMENTS

| | | | |
|---|---|---|---|
| 0747481 | 7/1980 | U.S.S.R. | ............................. 261/114.4 |
| 1503838 | 8/1989 | U.S.S.R. | ............................. 261/114.1 |
| 1041690 | 9/1966 | United Kingdom | ................ 261/114.1 |

*Primary Examiner*—C. Scott Bushey
*Attorney, Agent, or Firm*—Baker Botts L.L.P.

[57] ABSTRACT

An apparatus for connecting adjacent tray panel of a fractionation tray within a distillation column tower for the separation between a vapor and liquid is provided. A first interlocking panel has an alignment area with at least one alignment slot toward the center of the panel and at least one alignment aperture located distal from the center of the panel. A second interlocking panel has an alignment tab with a valve perforation on the alignment tab. The alignment tab of the second panel is inserted into the alignment slot of the first panel at an angle. The gravitational force on the panel opposite the alignment tab of the second panel aligns the second panel within the horizontal plane of the first panel such that no bolts are required during assembly. Dispersion valves are inserted into the valve perforation to disperse the vapor and prevent weeping to the tray below and flooding to the tray above. The valve perforation also reduces the dead zone region between the interlocking panels to increase the capacity and efficiency of the fractionation tray and distillation column.

7 Claims, 3 Drawing Sheets

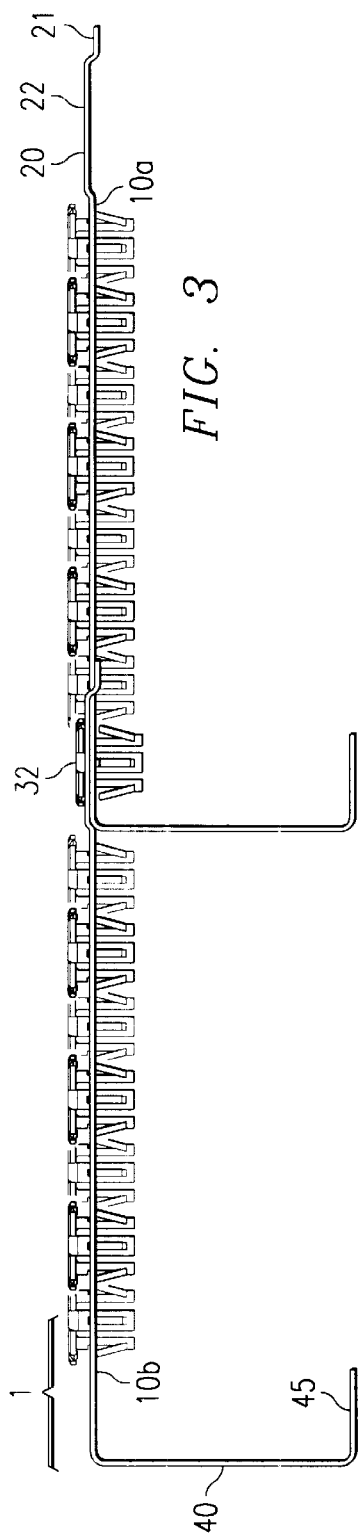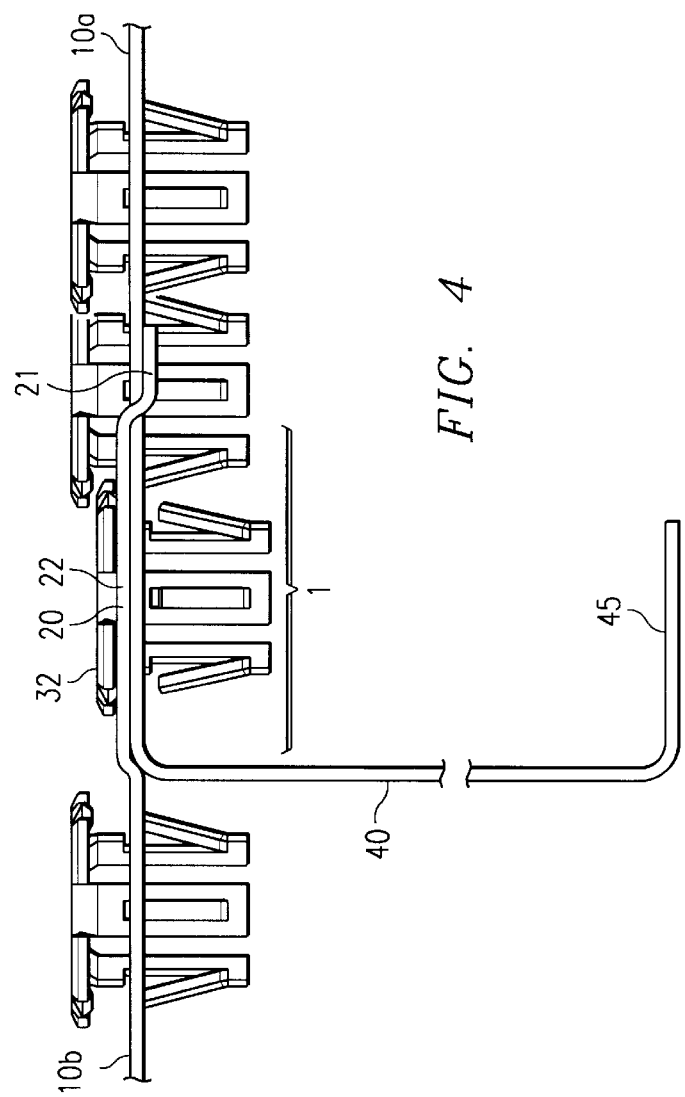

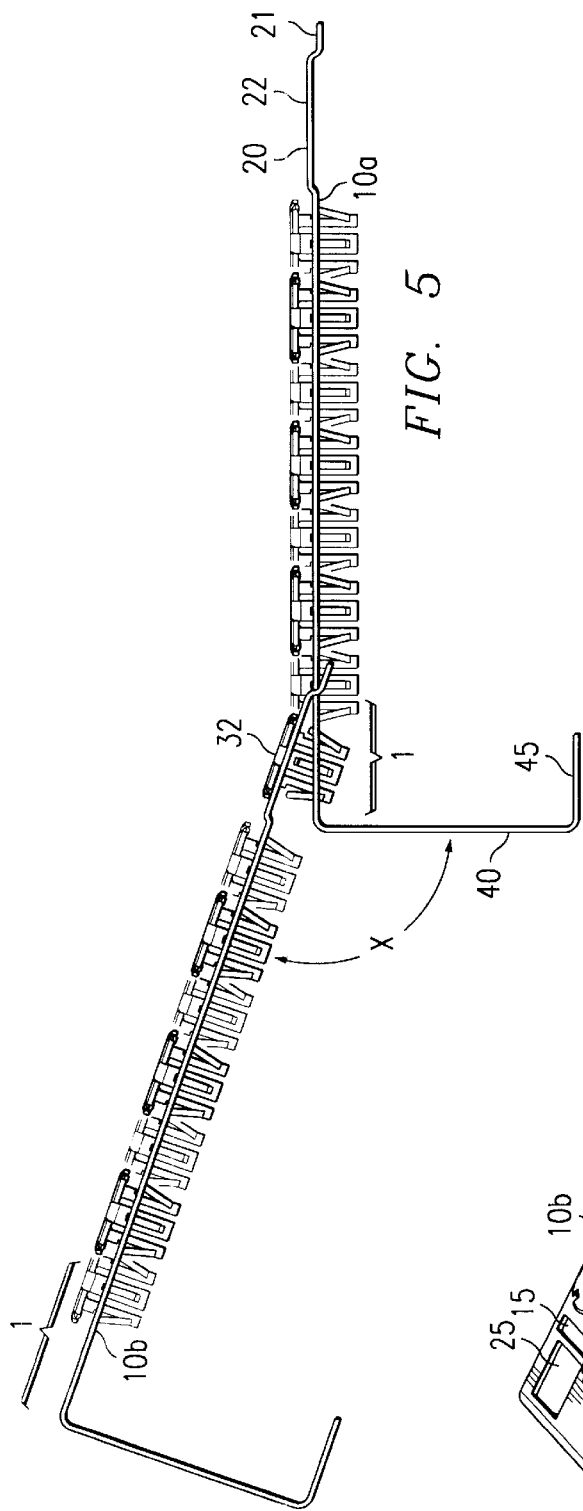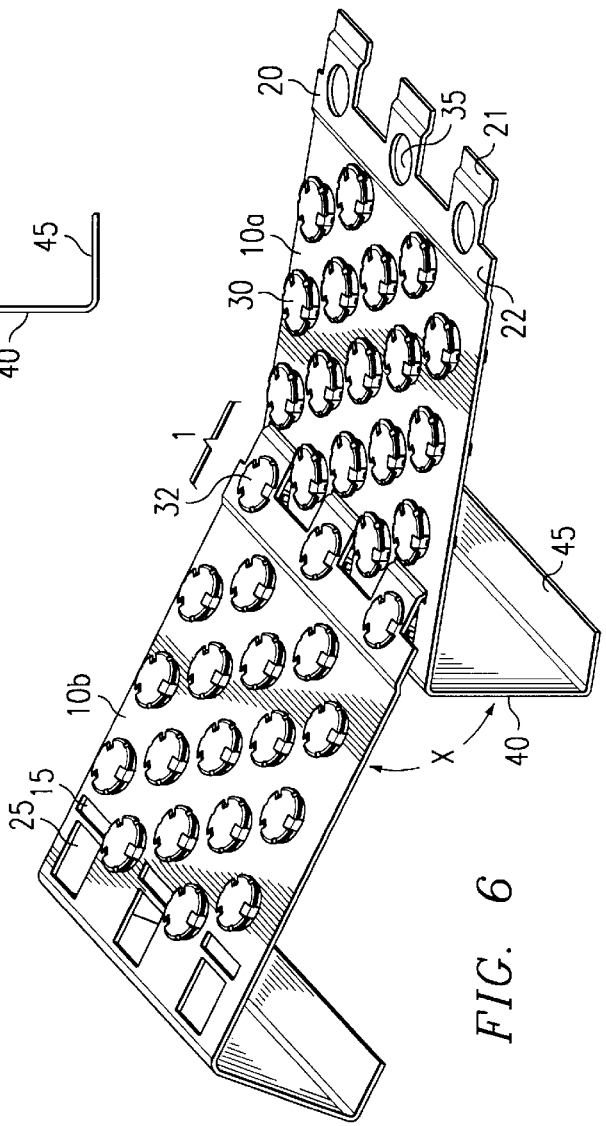

TRAY ATTACHMENT APPARATUS

BACKGROUND OF THE INVENTION

This invention relates to a fractionation tray for use within a distillation column. It particularly pertains to a novel apparatus and apparatus to minimize the time and cost needed for assembling fractionation trays for use in distillation columns and other related devices in the separation between two or more fluids such as a vapor and a liquid.

Distillation is a method in which a process fluid, typically a vapor and a liquid mixture of two or more substances, is separated into its component fractions of a desired purity, by the application and removal of heat under high pressure or vacuum. Distillation columns are designed to achieve this separation efficiently.

Basic distillation begins from a top portion of a column to a bottom portion of the column. Heavier process liquid flows down the column while lighter process vapor ascends up the column. The main components of distillation columns include a vertical shell and column internals, such as fractionation trays or packings where the separation of the process vapor and liquid substances occurs. These column internals increase and enhance the separation between the process vapor and liquid. The internal configurations of the column internals such as tray spacing, column diameter, placement of assemblies to enhance flow increase the efficiency and thereby lead to a lesser requirement of energy.

In a typical distillation column, the fractionation trays are horizontally mounted within the vertical shell. The particular design of the fractionation tray facilitates and enhances the separation between the process vapor and liquid by providing a more intimate contact between the fluids which leads to better separation. Each fractionation tray is comprised of several panels which are typically bolted to each other and subsequently attached by bolting or clamping to a cross-beam support member in the distillation column. The region between each panel and the support member is a "dead-zone" where little or no vapor-liquid interaction and separation occurs.

The area of the fractionation tray where the vapor and liquid contact is typically called the active area. The dead-zone regions or area between panels and surrounding the support member is generally subtracted from this area as an inactive area and does not contribute to the separation process. Thus, the combination of the dead-zone regions of all the fractionation trays reduces the efficiency of the column and more trays are required to balance the effect.

Recently, U.S. Pat. No. 5,468,425 to Nutter discloses an apparatus for modifying the dead-zone area of the trays to address the vapor-liquid contact in this area. The substantially large overlapping margin areas between the adjacent panels are provided with substantially geometrically identical apertures between each panel. The large margin areas are required for attaching the adjacent panels together by bolting.

While the addition of apertures in the margin area provides more apertures, the conventional bolts contribute to the same dead-zone problem as in conventional fractionation tray panel designs. Since the overlapping margin areas are significant and run the length of each adjacent panel, the area needed by the bolts to attach each panel together contributes to the dead-zone area. Thus, the benefit of apertures in the margin region are reduced in the capacity and efficiency of the tray and column.

Additionally, the Nutter tray follows conventional tray designs with respect to the installation of such trays by requiring two or more installers. Since each panels is attached to an adjacent panel by a bolt, at least one installer above the tray needs to position and align the bolt hole in one panel with the bolt hole in the second panel. Additionally, an installer must be positioned below the tray to ensure final bolting with either a nut or other locking device. A person skilled in the art will recognize that this conventional installation procedure is a substantial labor cost during the installation of the fractionation tray and contributes to the increased time required for the installation of the distillation column. Thus, there are no labor costs or time savings when required such as during a revamp whereby the entire plant is shut down to accommodate the replacement of the tower internals and any additional non-operational time impacts on the operation of the plant.

Accordingly, there is a need for a fractionation tray which reduces the dead-zone regions between the fractionation tray panels to provide an additional increase in the column capacity and efficiency. The fractionation trays should be easy and simple to construct while retaining enough strength for use in the high pressure vapor and liquid environment. The fractionation tray should also be easy to install to substantially reduce the labor cost and provide time savings during critical installations.

SUMMARY OF THE INVENTION

This invention relates to an apparatus for use in the contact between and separation of fluids in a distillation column for mass transfer exchange between two fluids of differing masses. According to the present invention, a fractionation tray surface is provided having first and second interlocking panels and a plurality of valve perforations. The valve perforations allow a lighter fluid such as a vapor flow from below and through the fractionation tray to interact with a heavier fluid such as a liquid flowing above the fractionation tray.

The first interlocking panel has a substantially horizontal flat surface with valve perforations and an alignment area. The alignment area has at least one alignment slot and at least one alignment perforation.

The second interlocking panel is positioned adjacent to the first interlocking panel. The second interlocking panel has at least one alignment tab for insertion into the alignment slot of the first interlocking panel. The alignment tab also contains a valve perforation.

During installation, the alignment tab is inserted into the alignment slot on the first interlocking panel. The valve perforation is aligned with the alignment perforation so that vapor can pass from below and through the fractionation tray to interact with liquid flowing across the surface of the tray.

The fractionation tray and panels are preferably supported by means of an integral truss member positioned at the alignment area. The integral truss member extends down from the alignment area and is designed to minimize interference with the alignment perforation. A flange extends from a foot portion of the integral truss for a stiffening effect to strengthen the truss for support.

In a preferred embodiment, a fractionation valve is inserted into the valve perforation of the alignment tab. The valve may be either a movable or fixed valve. Flooding and weeping are reduced by the use of the valve whereby the vapor ascending from below the fractionation tray is deflecting into a horizontal and lateral flow.

Preferably during installation, no bolts are used to connect the first and second interlocking panels thus minimizing the labor costs during installation. The interlocking panels provide for a quicker installation thereby reducing the time necessary to shut down the plant such as during a revamp operation. Additionally, the lack of bolts allows for a valve perforation to be placed in a traditionally inactive region to reduce the mechanical dead regions of the fractionation tray. This increases the capacity and efficiency of the fractionation tray and distillation column by allowing even greater interaction between the vapor and liquid.

The fractionation tray design of the present invention provides for a quick and easy installation. The alignment system of the panels reduces the cost of the fractionation tray in both labor costs and operating costs by increasing in the capacity and efficiency of the column.

BRIEF DESCRIPTION OF THE DRAWINGS

FIG. 3 is a close-up, side cross-section view of the alignment area between the first and second interlocking panels showing a more detailed alignment tab and valve.

FIG. 4 is a perspective view showing first and second interlocking panels with valve including and alignment area of the second interlocking panel and the alignment tabs of the first interlocking panel of the fractionation tray of FIG. 1.

FIG. 5 is a side elevational cross-section view of the second interlocking panel being inserted into the alignment area of the first interlocking panel to form the fractionation tray of FIG. 1.

FIG. 6 is a perspective view showing the second interlocking panel being inserted into the alignment area of the first interlocking panel to form the fractionation tray of FIG. 1.

DESCRIPTION OF THE PREFERRED EMBODIMENT

Figure 1:
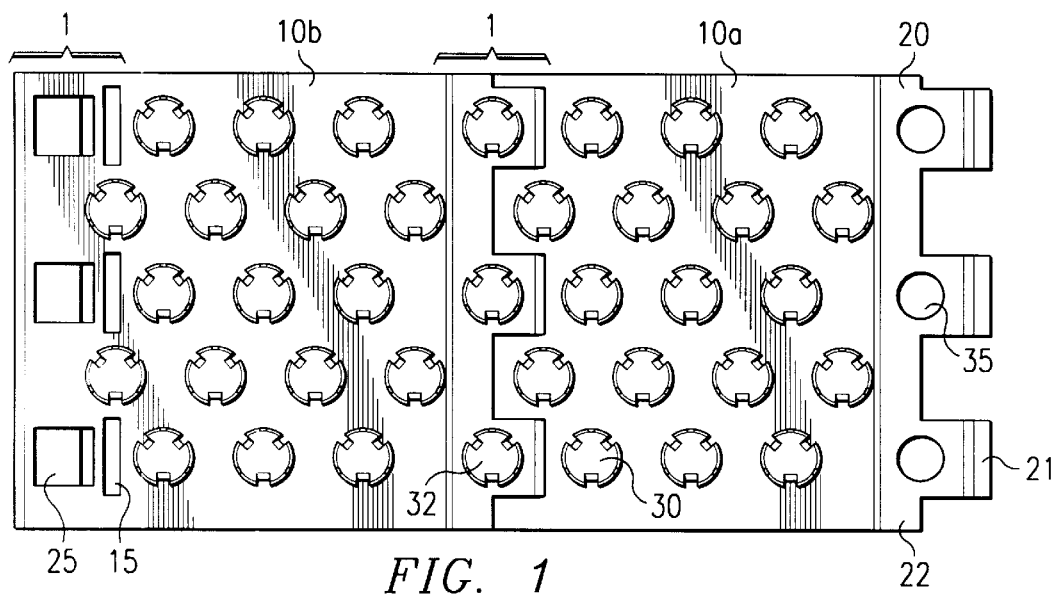
FIG. 1 is an overhead plan view a fractionation tray constructed according to the present invention showing a first interlocking panel connected to a second interlocking panel.

The following description of FIGS. 1 to 5 describe one preferred embodiment of the invention. The fractionation tray of the present invention is illustrated but is not limited to this embodiment. The descriptive language used both in the specification and claims is for the purposes of clarity and convenience and not with any purpose of implied limitation to mass transfer art, or to a vertical disposition of parts as is usually the case within a packed tower column.

The term "fluid" is adopted from the terminology of mass transfer applications, in order to describe generally, without restriction to mass transfer technology, the kind of particulates that would flow through the valve of the present invention. The particulates in mass transfer operations generally consist of droplets or bubbles at the molecular level or on a microscopic scale. Typically, "vapor" or "gas" is a lighter fluid and "liquid" is a heavier fluid. The tray valve of the present invention is ideally utilized in a high fluid pressure environment, such as in a trayed distillation tower column. This high fluid pressure environment allows for the separation of vapors and liquids.

The terms "tray" and "tray deck" refer to the surface within a tower column used in mass transfer applications.

The tray is also described as a fluid contacting fractionation tray. In a typical tray installation, the upper surface of the tray is toward the top of the tower and the lower surface of the tray is toward the bottom of the tower. Several tray perforations are positioned throughout the tray deck surface. Ordinarily, valves or other devices are positioned on or near the openings to regulate the flow of vapors through the liquids. However, the term fractionation tray herein means simply any surface through which a valve, such as in the present invention, is attached to.

Fluid flow is defined as the general movement of fluid throughout the distillation column and across the fractionation tray. The vapor flow is typically upward from the bottom of the column to the top of the column passing through the perforations in the tray deck. The liquid flow is typically downward from the top tray to the bottom tray. The liquid flows from an upstream or inlet portion of the fractionation tray to a downstream or outlet weir portion of the fractionation tray. After passing through the outlet weir, the liquid flows through the downcomer region and over the downcomer to the inlet portion of the tray below.

Throughout the specification and claims, reference is made to "movable" as generally describing the movement of a tray valve when inserted into the froth activator valve perforation. In general, a person of ordinary skill in the art would know that a valve assembly or other device of the present invention preferably moves in an upward and downward motion relative to the tray deck. This movement allows for the fluid to pass from below the tray deck to the upper surface to accomplish the fractionation of fluids required by mass transfer technology at different flow rates. The distance between the tray deck and the dispersion valve defines a fluid escape passage or opening where upwardly flowing particles pass through.

The terms "flooding" and "weeping" refer to conditions on the fractionation tray during operation. Flooding is where ascending vapor from below the fractionation tray shoots through any opening in the tray deck in a vertical and upwardly direction to pass relatively undisturbed through the liquid to hit the tray deck above. Typically, flooding occurs under high vapor pressure conditions allowing for the vapor to shoot through the liquid. Weeping occurs under low flow conditions whereby the low liquid flow seeps through the perforations in the tray surface so seep down to the tray below. Under higher liquid flow rates, "dumping" may occur where the liquid flows through the valve perforations instead of across the tray deck and through the downcomer.

The fractionation tray of the present invention may be constructed to fit within a mass transfer distillation column. The fractionation tray is illustrated, described and claimed, generically and in preferred specific embodiments.

Referring to the drawings, FIG. 1 is a plan view of the fractionation tray of the present invention. A first interlocking panel 10A has valve perforations with valves 30 inserted into each perforation. Preferably, a plurality of alignment tabs 20 are positioned along the entire length of the tray panel to attach to an adjacent interlocking panel. Each alignment tab 20 has a slot portion 21 and a raised portion 22.

As shown in FIG. 1, alignment tabs 20 are fixed and uniformly positioned along the edge of the interlocking panel 10A. Alignment area 1 (not shown) is positioned opposite alignment tabs 20. Each alignment tab 20 has a respective valve perforation 35 within the tab. Valve perforation 35 is preferably a substantially round opening but may be modified to accommodate any valve or other fluid deflecting assembly.

A second interlocking panel 10B shows the alignment area 1 which is the substantially the same as the alignment area on the first interlocking panel 10A. Alignment area 1 has an alignment slot 15 for receiving the slot portion 21 of alignment tab 20 of an adjacent tray panel. Alignment perforation 25 is positioned directly behind alignment slot 15. Preferably, alignment perforation is larger open area than valve perforation 35. This provides for a reduction of time during installation as the legs of valve 30 pass through the alignment aperture if the valves are pre-installed outside of the distillation column. The positioning of valve 30 within the valve perforations 35 prevent weeping and flooding in the closed and open positions, respectively.

Figure 2:
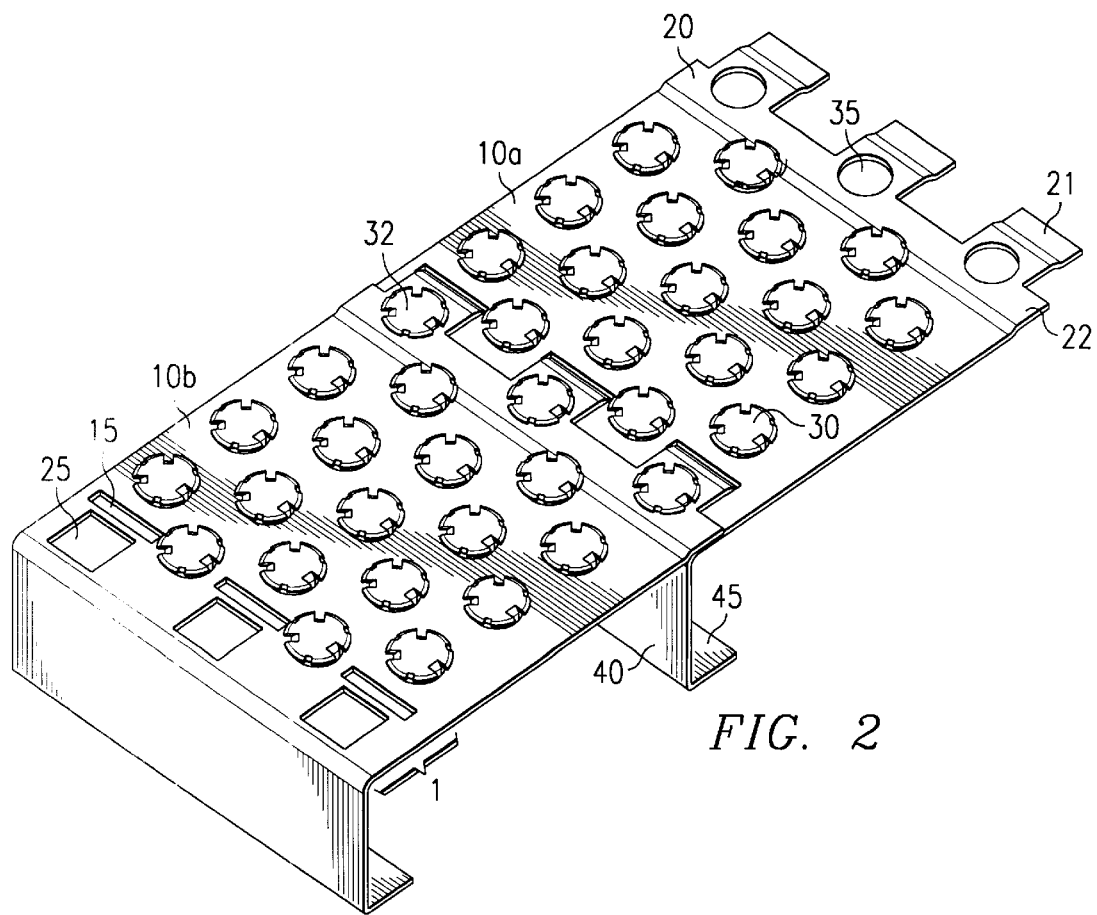
FIG. 2 is a side elevational cross-section view showing the first and second interlocking panels with valves in a plurality of valve perforations in the fractionation tray of FIG. 1.

FIG. 2 shows a perspective view of the interlocked panels of FIG. 1 of the present invention. The tray panels are shown fully assembled with valves 30 inserted in the valve perforations of the fractionation tray. Integral truss member 40 is illustrated in second interlocked panel 10B. The integral truss member 40 extends down from the alignment area 1 and does not interfere with vapor flow through alignment perforations 25. Integral truss 40 is the same thickness as the Referring now to FIG. 3, the interlocked tray panels are shown in a side elevational cross-section view. Valves 30 are shown inserted through the tray deck and into the valve perforations of the tray panels. Slot portion 21 and raised portion 22 of the alignment tab 20 are shown on the first interlocking panel 10A. The alignment tab 20 is preferably designed such that the interlocked tray panels remain substantially horizontal as shown in FIG. 2. Valve 32 is shown passing through the valve perforation and alignment perforation in the alignment area 1.

Integral truss member 40 extends down from the alignment area 1 as shown in FIG. 3. A truss flange 45 extends laterally from the integral truss member 40 to form a foot. This greatly increases the stiffness of the integral truss while allowing the truss to remain as a thin sheet of metal.

FIG. 4 shows a detailed cross-sectional view of the alignment area 1 with the alignment tab 20 inserted into the alignment slot 15 (not shown). Slot portion 21 is preferably below the horizontal plane of second interlocking panel 10B and is shown inserted through alignment slot 15. Raise portion 22 is positioned above the alignment area 1 of first interlocking panel 10A. The combination of slot portion 21 and raised portion 22 allows for the adjacent tray panels to remain in a flat, horizontal plane after installation for a more uniform flow of liquid across the tray deck surface. Valve 32 is inserted through both the alignment tab 20 of second interlocking panel 10B and alignment area 1 of first interlocking panel 10A. This provides for a bolt-less yet stable connection.

FIG. 4 also shows a close-up of the integral truss member 40 wherein the truss extends down from the alignment area 1. The truss member 40 is substantially the same thickness of metal as the remainder of the tray panel. Truss flange 45 extends laterally from truss member 40 to form a foot portion. This strengthens the truss member such that it is able to support the interlocked trays within the distillation column. One skilled in the art will recognize that the thickness of metal used in the fractionation trays and integral truss is based on standard thickness of materials. The construction material include carbon steel and can range from 7 gauge or 4.5 mm in thickness to 10 gauge or 3.5 mm in thickness of the carbon steel. Stainless steel may be used as the construction material and range from 14 gauge or 2.0 mm in thickness to the 10 gauge material thickness. The thinner gauge of material such as the 14 gauge material may also include exotic metals such as titanium metal.

FIG. 5 illustrates the insertion of the second interlocking panel into the alignment area of the first interlocking panel from a side cross-sectional view. The slot portion 21 of alignment tab 20 is inserted into the alignment slot of the first interlocking panel 10A at an angle designated by X. To facilitate installation, the valves 20 are inserted into the tray decks before installation into the distillation column. This reduces the cost of installation since the column is typically a cramped vertical shell in comparison so the tray panels. By inserting the valves 30 into the tray panels outside of the column, the installation occurs quicker and with less labor costs.

The legs of valve 32 in the valve perforation 35 of the alignment tab 20 then pass through the alignment perforation 25. Since alignment perforation 25 is preferably larger than valve perforation 35, the legs of valve 32 are easily inserted into alignment perforation 25. As gravity acts on the distal end of the second interlocking panel 10B, the second panel moves through angle X to become aligned in the horizontal plane of the first interlocking panel as shown in FIG. 3.

Referring now to FIG. 6, the installation of the interlocking panels is shown in a perspective view. As the second interlocking panel passes through angle X, each of the valves 32 within the valve perforations 35 of the alignment tabs 20 will become inserted into the alignment perforation 25 of the first interlocking panel. The natural gravitational force of the interlocking panel 10B provides the necessary force to align the tray panels into the desired horizontal orientation.

The present invention significantly reduces the labor cost for installing the tray within a distillation column since the interlocking panels provide for a quicker installation while reducing labor necessary for the installation. The design of the alignment area allows the installer to easily align one tray panel with an adjacent tray panel. Thus, the installation time for the tray panels of the present invention is significantly reduced allowing for a quicker turn around time during time critical column and plant revamps.

The alignment area with the perforations also reduces the amount of dead region while eliminating the requirement for additional bolting between the tray panels. This increases the capacity of the column since the dead zones provide for an increased vapor and liquid interaction area. Thus, the efficiency of the entire column is increased since less fractionation tray decks may be used as a result of the reduced dead or inactive regions.

While the invention has been described with respect to its preferred embodiments, other alternative constructions can be used. For example, the size and shape of the interlocking tabs and perforations may be adjusted depending on the design of the valves to be inserted into the fractionation tray. A bolt may be used in between alignment tabs to further strengthen the interlock between the panels.

Fixed valves may be used in the valve perforations. A microdispersion valve such as that disclosed in U.S. Provisional Patent Application Ser. No. 60/061,504 by Chuang, et al. filed Oct. 10, 1997, now Non-Provisional Patent Application Ser. No. 09/145,187, filed Sep. 1, 1998, may be used to further disperse the rising vapor into the liquid flow. The microdispersion effect of the canopied valves provide for a finer dispersion of the vapors such that the vapor is microdispersed within the liquid to allow for a greater vapor-liquid interaction. This greatly increases the separation and distillation process. The microdispersion valves may be used across the entire tray deck or within the alignment areas alone.

The thickness of the metal used in constructing the tray panels will allow for an adjustment in the height of the integral truss such that the reduced dead region is not blocked. One skilled in the art will recognize that the tray panels may be curved such as in the panel sections closer to the circular shell of the distillation column.

These and various other modifications can be made to the disclosed or other embodiments without departing from the subject of the invention.

What is claimed is:

1. A fractionation tray for use in a distillation column to enhance separation interaction between a vapor and a liquid comprising:

a plurality of interlocking panels having a plurality of valve perforations for the passage of said vapor from below and through the fractionation tray to interact with said liquid flowing above the fractionation tray;

a first said interlocking panel having an alignment area with at least one alignment slot and at least one alignment perforation;

a second said interlocking panel having at least one alignment tab for insertion into said alignment slot of the first said interlocking panel and a valve perforation within said alignment tab such that when the second said interlocking panel is aligned with the first said interlocking panel and the alignment tab is inserted into the alignment slot on the first said interlocking panel, the valve perforation aligns with the alignment perforation so that vapor can pass from below and through the fractionation tray to interact with the liquid above the fractionation tray whereby mechanical dead zones are reduced across the fractionation tray; and a support means for mounting said fractionation tray within said distillation tower.

2. The fractionation tray according to claim 1 wherein said support means comprises an integral truss portion extending down from the alignment area to support said interlocking panels within the distillation column such that the integral truss portion is positioned away from the alignment perforation to prevent blockage of the vapors flowing from below and through the fractionation tray while providing support for the fractionation tray.

3. The fractionation tray according to claim 2 wherein said integral truss portion has a flange extension to provide greater strength for supporting the interlocking panels and fractionation tray.

4. The fractionation tray according to claim 1 wherein each of said interlocking panels is interlocked and stabilized without bolts after the alignment tab of the second interlocking panel is inserted into the alignment slot of the first interlocking panel by gravity exerted on a distal portion of the second tray panel opposite the alignment area whereby the interlocking panels form a substantially flat surface.

5. The fractionation tray according to claim 1 wherein a movable valve is inserted into the said valve perforation on the alignment tab of the second interlocking panel so that the vapor flowing from below the fractionation tray through the alignment aperture and the valve perforation is directed into a horizontal and lateral flow when interacting with the liquid to prevent flooding.

6. The fractionation tray according to claim 5 wherein the movable valve is a microdispersion valve to provide greater mixing between the vapor and the liquid and prevent flooding and weeping in the alignment area under variable flow conditions.

7. The fractionation tray according to claim 1 wherein a fixed valve is attached to the valve perforation of the second panel so that the vapor flowing from below the fractionation tray through the alignment perforation and the valve perforation is directed into a horizontal flow when interacting with the liquid to prevent flooding of the tray section.

* * * * *

UNITED STATES PATENT AND TRADEMARK OFFICE
CERTIFICATE OF CORRECTION

Patent No.: 6,068,244
Dated: May 30, 2000
Inventor(s): Burton et al.

It is certified that errors appear in the above-identified patent and that said Letters Patent is hereby corrected as shown below:

On the title page:

[73] After "Assignee" delete "ATM " and insert --AMT--.

Signed and Sealed this

Twenty-fourth Day of April, 2001

*Attest:*

NICHOLAS P. GODICI

*Attesting Officer*   Acting Director of the United States Patent and Trademark Office